(12) United States Patent
Capellmann et al.

(10) Patent No.: US 11,192,427 B2
(45) Date of Patent: Dec. 7, 2021

(54) PRESSURE DECOUPLING OF AIR INTAKE DRAINAGE AND DRAINAGE OF MAIN HOUSING

(71) Applicant: Halla Visteon Climate Control Corp., Daejeon (KR)

(72) Inventors: Christoph Capellmann, Würselen (DE); Gerd Vondahlen, Gangelt (DE); Detlef Handwerk, Cologne (DE); Johannes Stausberg, Cologne (DE)

(73) Assignee: HANON SYSTEMS, Daejeon-si (KR)

( * ) Notice: Subject to any disclaimer, the term of this patent is extended or adjusted under 35 U.S.C. 154(b) by 260 days.

(21) Appl. No.: 14/721,289

(22) Filed: May 26, 2015

(65) Prior Publication Data

US 2015/0343880 A1      Dec. 3, 2015

(30) Foreign Application Priority Data

May 30, 2014   (DE) .......................... 102014107666.4

(51) Int. Cl.
*B60H 1/00*   (2006.01)

(52) U.S. Cl.
CPC .................... *B60H 1/00514* (2013.01); *B60H 2001/00085* (2013.01); *Y10T 137/6881* (2015.04)

(58) Field of Classification Search
CPC .................... B60H 2001/00085; B60H 1/3233
USPC ......................................................... 454/147
See application file for complete search history.

(56) References Cited

U.S. PATENT DOCUMENTS

| 7,284,388 | B2 * | 10/2007 | Yoshida | F28F 17/005 62/285 |
| 9,581,343 | B2 * | 2/2017 | Berger | F24F 1/0011 |
| 2006/0242984 | A1 * | 11/2006 | Kang | B60H 1/00514 62/285 |
| 2007/0023162 | A1 * | 2/2007 | Kim | B60H 1/3233 165/42 |
| 2012/0138697 | A1 * | 6/2012 | Richter | B60H 1/3233 236/49.1 |
| 2015/0251516 | A1 * | 9/2015 | Mazzocco | B60H 1/3233 62/244 |
| 2016/0001637 | A1 * | 1/2016 | Kume | F24F 13/222 62/285 |

FOREIGN PATENT DOCUMENTS

DE       102010062406 A1    6/2012
EP            1674310 B1    1/2009
(Continued)

*Primary Examiner* — Steven B McAllister
*Assistant Examiner* — Elizabeth M. May
(74) *Attorney, Agent, or Firm* — Shumaker, Loop & Kendrick, LLP; James D. Miller

(57) ABSTRACT

A drainage system for draining water from an air intake and from an air distribution housing of an air conditioning system into the environment. The drainage system including a drainage opening or the drainage of water into the environment, wherein the drainage opening is formed on a lower shell of the air distribution housing and is divided into a drainage area for water from the air intake housing on the one hand, and a drainage area for water from the air distribution housing on the other hand, and wherein the drainage area for water from the air intake housing is formed by the terminus of a separate duct for the drainage of water from the air intake. In this way, the reciprocal effect between the different pressure levels is avoided or reduced to the extent possible.

17 Claims, 4 Drawing Sheets

(56) References Cited

FOREIGN PATENT DOCUMENTS

| | | |
|---|---|---|
| JP | 2001239825 A | 9/2001 |
| JP | 2006082725 A | 3/2006 |
| KR | 1020060071259 A | 6/2006 |
| KR | 20070014442 A | 2/2007 |
| KR | 20080009428 A | 1/2008 |

* cited by examiner

PRESSURE DECOUPLING OF AIR INTAKE DRAINAGE AND DRAINAGE OF MAIN HOUSING

CROSS-REFERENCE TO RELATED APPLICATION

This application claims the benefit of priority of German Patent Application Ser. No. 10 2014 107 666.4 filed on May 30, 2014, the entire disclosure of which is hereby incorporated herein by reference.

FIELD OF THE INVENTION

The invention relates to a drainage system for draining water from an air intake and from an air distribution housing of an air conditioning system, in particular, for motor vehicles.

BACKGROUND OF THE INVENTION

One requirement of a heating, ventilating, and air conditioning system is that it is able to ensure a drainage of water from an area of an air intake into an air distribution housing of the heating, ventilating, and air conditioning system, and from the heating, ventilating, and air conditioning system into the environment. The area of the air intake is connected via a drain hose or a correspondingly designed duct to a lower shell of the air distribution housing, from which the water is able to drain via an opening at a lowest point into the environment. The area of the air intake and the air distribution housing are passed through by air and exhibit different pressure levels. The area of the air intake is situated on a suction side of a fan. The air distribution housing, however, is situated on a discharge side of the fan. Thus, an excess pressure exists in the air distribution housing as opposed to the area of the air intake. Absolute values depend on the respective operating conditions. As a result, the water that is intended to drain from the area of the air intake is forced to overcome this pressure difference. This can only be achieved if the air intake is situated correspondingly higher and is able to form a water column sufficiently large or, as a result, a sufficiently high hydrostatic pressure is present, which is able to force the water "downward" into the air distribution housing. Depending on the installation space, however, it is not possible to position the air intake correspondingly higher than the air distribution housing. Thus, there is the risk of water collecting in the air intake, which must not be allowed to drip into a vehicle interior under any circumstances. A reliable draining of the water must be ensured.

There is also the risk that, given a correspondingly unfavorable pressure difference between the air intake and the air distribution housing, water could be suctioned from the air distribution housing back into the air intake. Currently, this is prevented using a type of check valve at one end of the drain hose, or a duct having a two-component cover is formed in the lower shell of the air distribution housing, in which duct the water is able to drain from the air intake directly into the environment.

A disadvantage of these known solutions is that two-component covers for sealing the separation point between the air intake housing and the filter cover are associated with high costs. Moreover, the component may vary with respect to right-hand drive vehicles and left-hand drive vehicles. A check valve in the drain hose is an additional part, which must be manufactured, installed, and tested. This, too, increases costs.

SUMMARY OF THE INVENTION

The object of the invention is to enable a drainage under the specified conditions, without the need for using the aforementioned, additional, and more complex components.

The object is achieved by a drainage system having the features according to patent claim 1. Refinements are specified in the dependent claims.

The drainage system according to the invention for draining water from an air intake and from an air distribution housing of an air conditioning system into the environment comprises a drainage opening for the drainage of water into the environment. The drainage opening is formed on a lower shell of the air distribution housing and is divided on the one hand into a drainage area for water from the air intake housing, and a drainage area for water from the air distribution housing on the other hand, wherein the drainage area for the water from the air intake housing is formed by the terminus of a separate duct for the drainage of water from the air intake.

In this way, the reciprocal effect between the different pressure levels is avoided or reduced to the extent possible. According to the inventive concept, the drainage of the air intake housing terminates in the lower shell of the air distribution housing at the point at which a direct discharge into the environment is possible and, thus, where virtual environmental pressure and no excess pressure exists. With the invention, it is possible to guide the water via a drain hose from the air intake housing to the air distribution housing, and to then direct it in the lower shell in a duct directly to the drainage opening, i.e., the drain opening in the lower shell. In this configuration, the drain hose is preferably attached to a connecting piece of the duct. In one particularly advantageous embodiment of the invention, the duct is integrally formed with the lower shell, made preferably of a plastic part. This means that the duct is part of the lower shell and, thus, no extra (two-component) cover is required. In this way, the different pressure levels between the air intake housing and the air distribution housing are decoupled and the drainage of water from the air intake housing is facilitated, without the need for additional components and additional installation expenditure.

The duct preferably includes a connecting piece, which protrudes from an outer wall of the air distribution housing, preferably from the lower shell. A drain hose coming from the air intake or air distribution housing may be attached to this connecting piece.

In another advantageous embodiment of the invention, the terminal area of the duct is vertically angled within the air distribution housing, wherein the lower terminus of the angled terminal area forms the drainage area for the air intake housing.

There are multiple possibilities dividing the drainage opening into the aforementioned different drainage areas. In one embodiment, the division of the drainage opening into two drainage areas is achieved in that the width of the duct is smaller than the width of the drainage opening.

It has proven particularly advantageous to divide the drainage opening into two drainage areas, wherein the horizontal length of the duct covers only a portion of the drainage opening, in particular, in those cases in which the duct is at least just as wide as the drainage opening.

DESCRIPTION OF THE DRAWINGS

Additional details, features and advantages of designs of the invention emerge from the following description of exemplary embodiments with reference to the associated drawings, in which.

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner.

Figure 1:
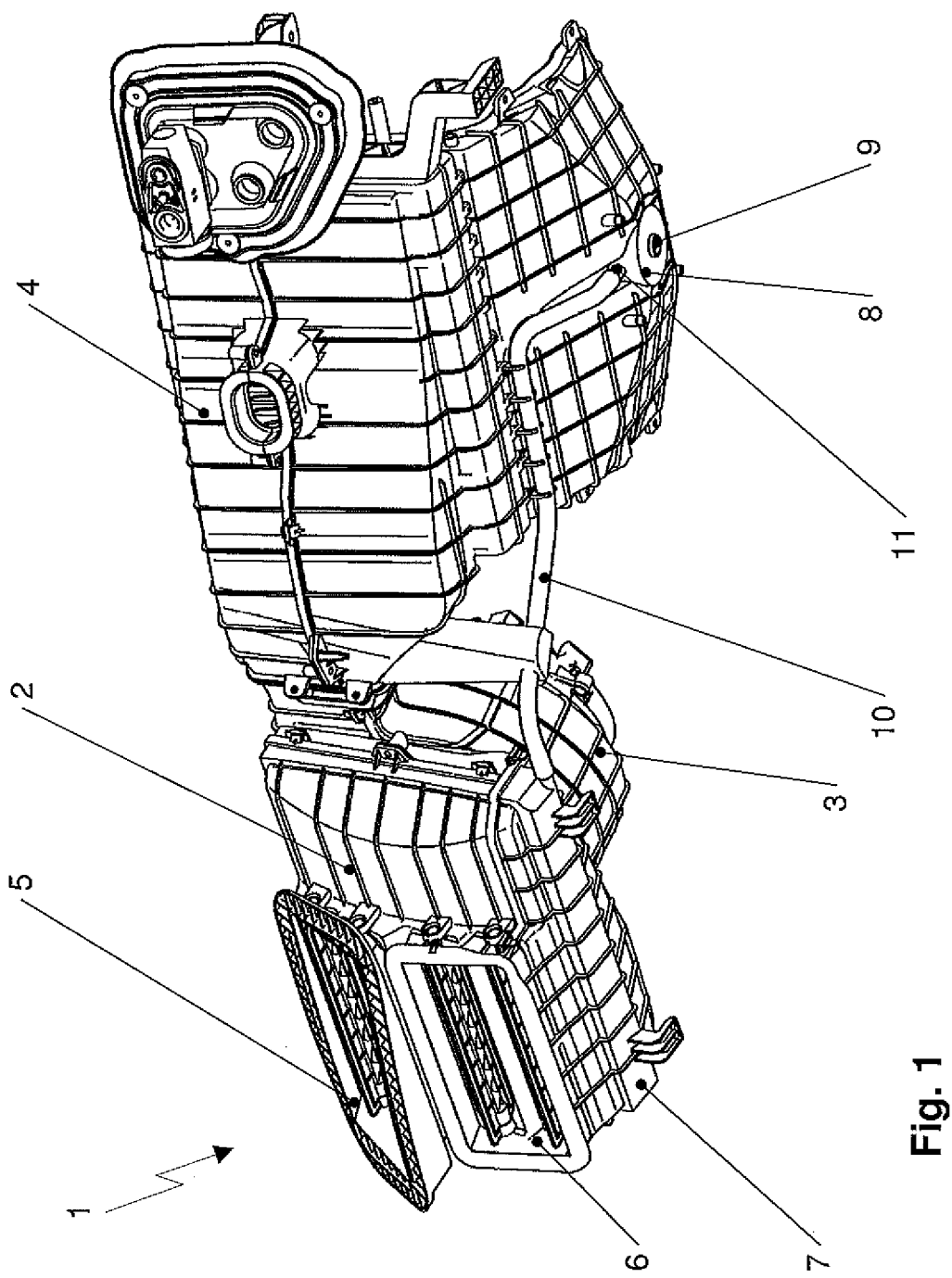
FIG. 1: shows a drainage system for drainage of water from an area of an air intake of an air conditioning system into the environment.

FIG. 1 shows a portion of an air conditioning system 1, including an air intake housing 2, a fan scroll 3 positioned behind the air intake housing 2, and an air distribution housing 4. An upper area of the air intake housing 2 has a fresh air opening 5 and a lower area thereof has a recirculation air opening 6. A filter cover 7 is situated in the bottom area of the air intake housing 2. The filter cover 7 at the bottom of the air intake housing 2 is necessary in order to be able to change the air filter, which is also seated in this area. The bottom area of the air distribution housing 4 has a lower shell 8. Formed at the bottom of the lower shell 8 is a drainage opening 9 for a draining of water from the area of the air intake housing 2 and from the air distribution housing 4 into the environment. The water of the air distribution housing 4 is mainly condensation originating from an evaporator of the air conditioning system 1. A drain hose 10 extends from the lower area of the air intake housing 2 to the lower shell 8. The area of the air intake housing 2 is connected via the drain hose 10 to a duct 11 of the lower shell 8 of the air distribution housing 4, from where the water may drain off via the drainage opening 9 at a lowest point of the lower shell 8 into the environment.

Figure 2:
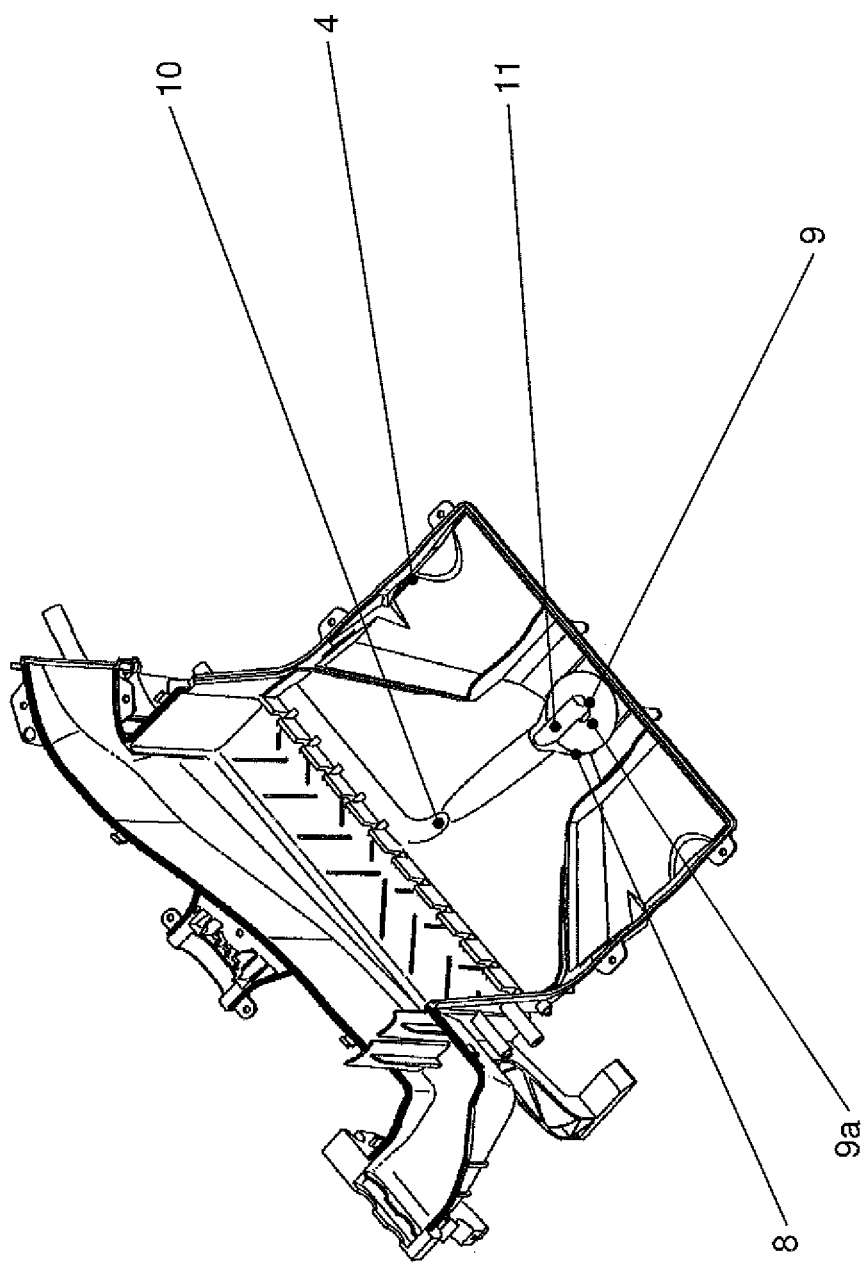
FIG. 2: shows an interior view of the air distribution housing in the area of a lower shell with an interior view of a drainage opening.

FIG. 2 shows a detailed interior view of the air distribution housing 4 in the area of the lower shell 8 with a top view of the drainage opening 9. The drain hose 10 is attached to the duct 11 just upstream from the drainage opening 9, the duct 11 being part of the plastic portion of the lower shell 8, and terminates at the drainage opening 9 to the environment. In this way, the drainage is continued downstream from the drain hose 10 in the duct 11. A diameter of the duct 11 does not cover the width of the drainage opening 9 in its entirety, but rather only in part. A portion 9a of the drainage opening 9 situated outside the duct 11 is available for the drainage of the water from the air distribution housing 4 into the environment, the water originating mainly from the evaporator of the air conditioning system 1. Alternatively, it is also possible to design the part 9a wherein the diameter of the duct 11 in fact covers the entire width of the drainage opening 9, but is designed short enough so that a portion of the drainage opening 9 upstream thereof remains free, that portion being correspondingly available for the drainage of water from the air distribution housing 4 into the environment.

Figure 3:
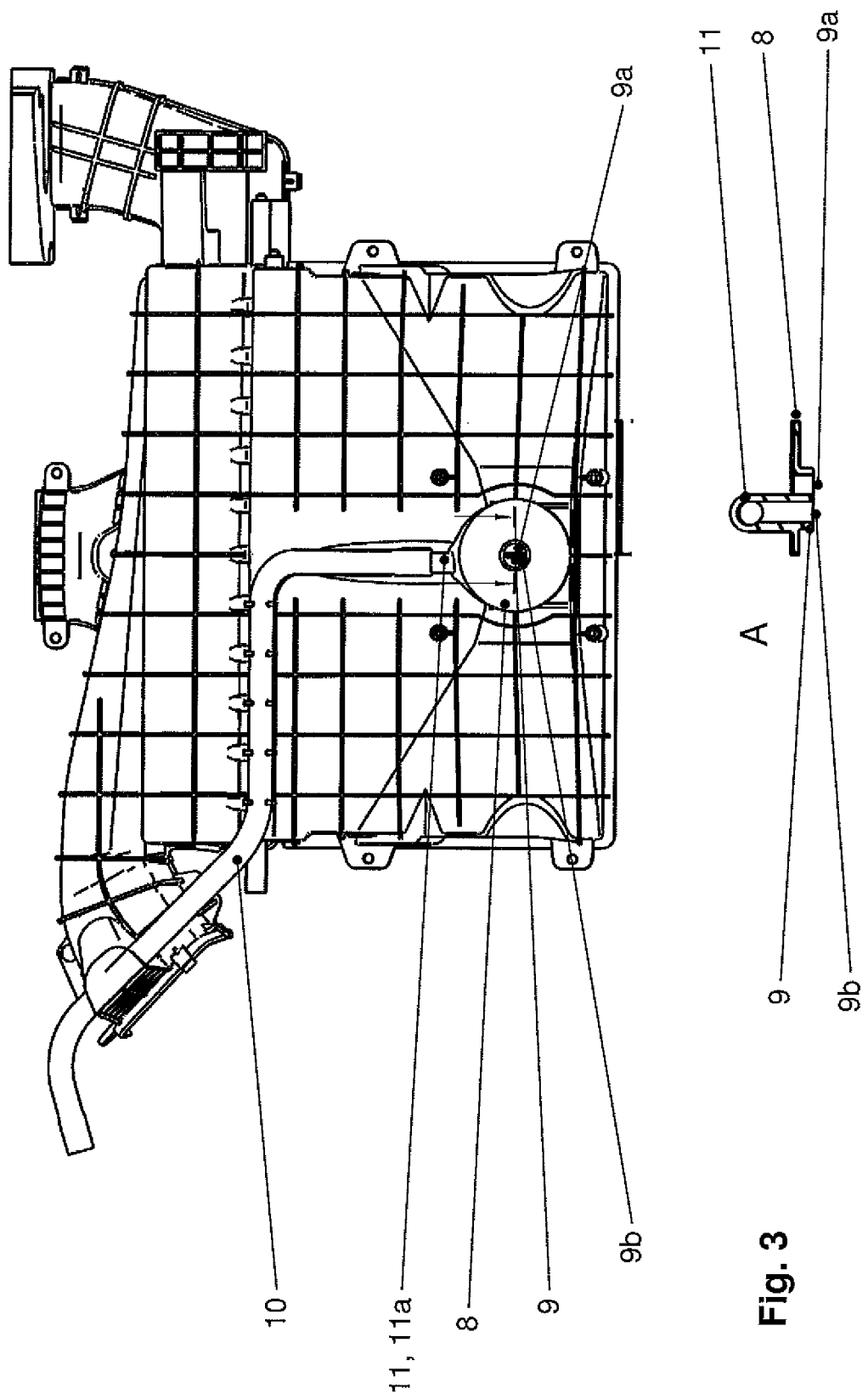
FIG. 3: shows a view from below the lower shell of the air distribution housing and of the drainage opening, supplemented by a sectional view of the lower shell in the area of the drainage opening for the drainage of water into the environment.

FIG. 3 shows a view from below of the lower shell 8 of the air distribution housing 4 and of the drainage opening 9, as well as the drain hose 10. The drain hose 10, which extends from the air intake or air intake housing 2 (not shown in FIG. 3) to the lower shell 8, is attached to the connecting piece 11a of the duct 11 of the lower shell 8. As previously mentioned, the duct 11 is part of the plastic portion of the lower shell 8. The drainage opening 9 into the environment is separated into a drainage area 9b for the air intake housing 2 on the one hand, and a drainage area 9a for the air distribution housing 4 on the other hand, as is shown in the additional sectional view A of the lower shell 8 in the area of the drainage opening 9. Whereas the drainage area 9b forms the terminus of the duct 11, water is able to drain directly from the air distribution housing 4 via the drainage area 9a for the air distribution housing 4. The drainage area 9a is formed as a result of the terminal area 11b (shown in FIG. 4) of the duct 11 being so narrow that the diameter thereof occupies only a portion of the drainage opening 9.

Figure 4:
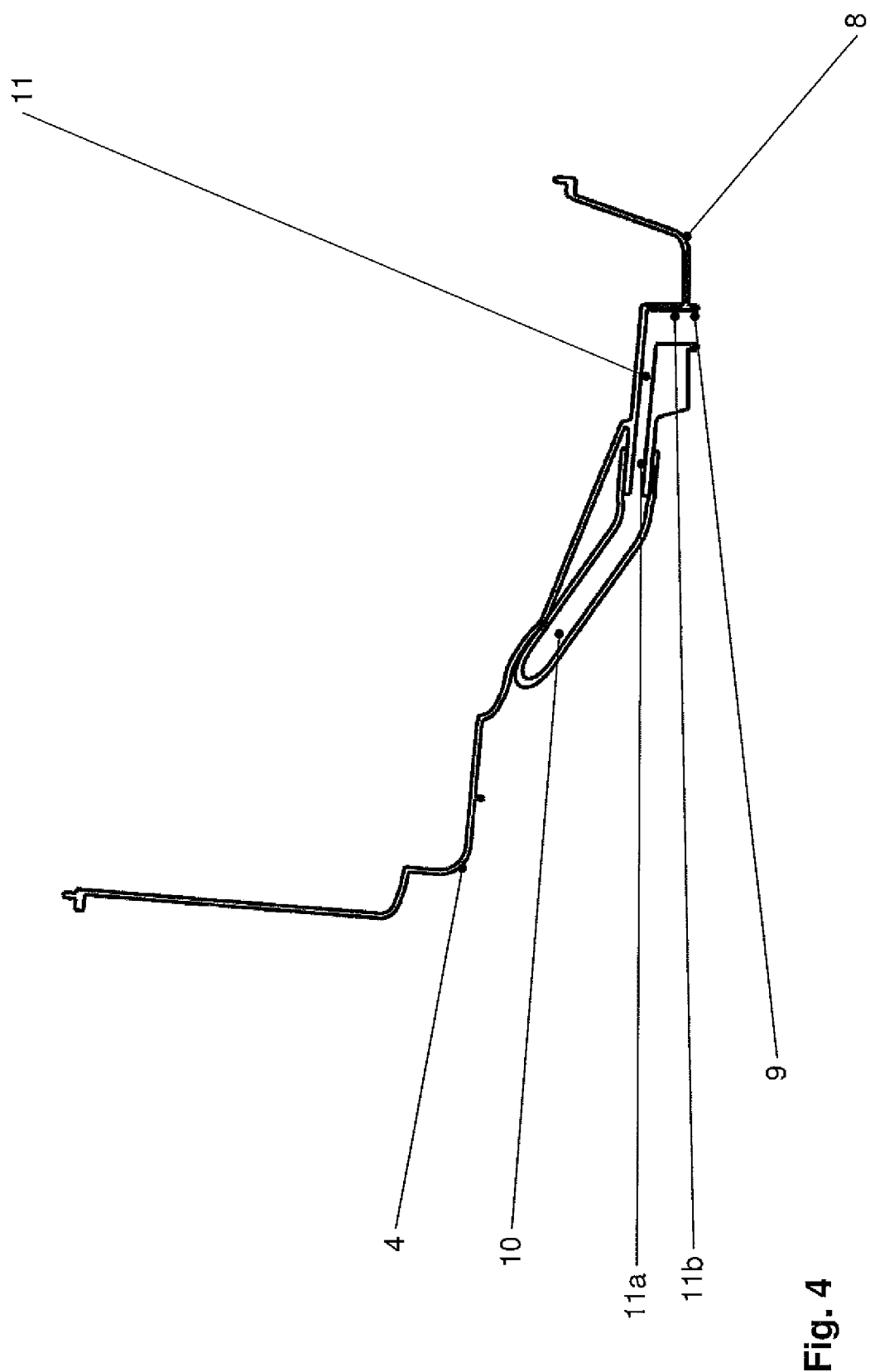
FIG. 4: shows a sectional view of the lower shell of the air distribution housing of the drainage opening and of the drain hose.

FIG. 4 shows a sectional view of the lower shell 8 of the air distribution housing 4, the drainage opening 9, the drain hose 10 and the duct 11. As shown in FIG. 4, the drain hose 10 extends initially outside the air distribution housing 4, and is attached to a connecting piece 11a of the duct 11, wherein the connecting piece 11a protrudes from the air distribution housing 4. The duct 11 is part of the plastic portion of the lower shell 8 of the air distribution housing 4 and, except for connecting piece 11a, extends inside the air distribution housing 4. The duct 11 is angled downwardly in the terminal area 11b, so that the duct 11, which extends initially horizontally, is aligned vertically in the terminal area 11b relative to the drainage opening 9.

From the foregoing description, one ordinarily skilled in the art can easily ascertain the essential characteristics of this invention and, without departing from the spirit and scope thereof, can make various changes and modifications to the invention to adapt it to various usages and conditions.

LIST OF REFERENCE NUMERALS 1 part of the air conditioning system
2 air intake housing
3 fan scroll
4 air distribution housing
5 fresh air opening
6 recirculation air opening
7 filter cover
8 lower shell
9 drainage opening
9a drainage area for the air distribution housing
9b drainage area for the air intake housing
10 drain hose
11 duct
11a connecting piece (as part of the duct 11)
11b terminal area (of the duct 11).

What is claimed is:

1. A drainage system for draining water from an air intake housing and from an air distribution housing of an air conditioning system into an environment, the drainage system comprising:
a fan causing air to flow through the air conditioning system, wherein the air intake housing is disposed upstream of the fan with respect to a direction of flow of the air through the air conditioning system and wherein the air distribution housing is disposed downstream of the fan with respect to the direction of flow of the air through the air conditioning system; and
a drainage opening draining water into the environment, the drainage opening formed on a lower shell of the air distribution housing and divided into a first drainage area for water from the air intake housing and a second drainage area for water from the air distribution housing, the first drainage area for water from the air intake housing formed by a terminal area of a duct routing water from the air intake housing, wherein the duct extends through an internal space defined by the lower shell of the air distribution housing and fluidly separates the water passing through the duct upstream of the first drainage area from the water passing through the internal space of the lower shell upstream of the second drainage area, wherein the first drainage area outlets directly to the environment and the second drainage area outlets directly to the environment, and wherein the duct is integrally formed with the lower shell.

2. The drainage system according to claim 1, wherein the duct is formed from plastic.

3. The drainage system according to claim 1, wherein the duct includes a connecting piece protruding from an outer wall of the air distribution housing, wherein a drain hose fluidly couples the air intake housing to the connecting piece of the duct.

4. The drainage system according to claim 3, wherein the connecting piece protrudes from the lower shell of the air distribution housing.

5. A drainage system for draining water from an air intake housing and from an air distribution housing of an air conditioning system into an environment, the drainage system comprising:
a fan causing air to flow through the air conditioning system, wherein the air intake housing is disposed upstream of the fan with respect to a direction of flow of the air through the air conditioning system and wherein the air distribution housing is disposed downstream of the fan with respect to the direction of flow of the air through the air conditioning system; and
a drainage opening draining water into the environment, the drainage opening formed on a lower shell of the air distribution housing and divided into a first drainage area for water from the air intake housing and a second drainage area for water from the air distribution housing, the first drainage area for water from the air intake housing formed by a terminal area of a duct routing water from the air intake housing, wherein the duct extends through an internal space defined by the lower shell of the air distribution housing and fluidly separates the water passing through the duct upstream of the first drainage area from the water passing through the internal space of the lower shell upstream of the second drainage area, wherein the first drainage area outlets directly to the environment and the second drainage area outlets directly to the environment, wherein the duct is angled vertically in the terminal area of the duct within the air distribution housing.

6. The drainage system according claim 5, wherein a lower end of the terminal area of the duct forms the first drainage area for water from the air intake housing.

7. The drainage system according to claim 1, wherein the first drainage area for water from the air intake housing and the second drainage area for water from the air distribution housing are formed due to a width of the duct being smaller than a width of the drainage opening.

8. The drainage system according to claim 1, wherein the first drainage area for water from the air intake housing and the second drainage area for water from the air distribution housing are formed due to a horizontal length of the duct covering only a portion of the drainage opening.

9. A drainage system for draining water from an air conditioning system into an environment, the drainage system comprising:
a fan causing air to flow through the air conditioning system;
an air intake housing disposed upstream of the fan with respect to a direction of flow of the air through the air conditioning system;
an air distribution housing disposed adjacent the air intake housing and downstream of the fan with respect to the direction of flow of the air through the air conditioning system, the air distribution housing including a lower shell;
a first drainage area formed by a terminal area of a duct routing water from the air intake housing, the first drainage area draining water to the environment from the air intake housing, wherein the duct extends through an internal space defined by the lower shell of the air distribution housing; and
a second drainage area draining water to the environment from the air distribution housing, the first drainage area and the second drainage area formed on the lower shell of the air distribution housing, wherein the duct fluidly separates the water passing through the duct upstream of the first drainage area from the water passing through the internal space of the lower shell upstream of the second drainage area, wherein the first drainage area outlets directly to the environment and the second drainage area outlets directly to the environment, and wherein the duct is integrally formed with the lower shell.

10. The drainage system according to claim 9, wherein the duct is formed from plastic.

11. The drainage system according to claim 9, wherein the duct includes a connecting piece protruding from an outer wall of the air distribution housing.

12. The drainage system according to claim 11, wherein the connecting piece protrudes from the lower shell of the air distribution housing.

13. The drainage system according claim 9, wherein a lower end of the terminal area of the duct forms the first drainage area.

14. A drainage system for draining water from an air conditioning system into an environment, the drainage system comprising:
a fan causing air to flow through the air conditioning system;
an air intake housing disposed upstream of the fan with respect to a direction of flow of the air through the air conditioning system;
an air distribution housing disposed adjacent the air intake housing and downstream of the fan with respect to the direction of flow of the air through the air conditioning system, the air distribution housing including a lower shell;

a first drainage area formed by a terminal area of a duct routing water from the air intake housing, the first drainage area draining water to the environment from the air intake housing, wherein the duct extends through an internal space defined by the lower shell of the air distribution housing; and a second drainage area draining water to the environment from the air distribution housing, the first drainage area and the second drainage area formed on the lower shell of the air distribution housing, wherein the duct fluidly separates the water passing through the duct upstream of the first drainage area from the water passing through the internal space of the lower shell upstream of the second drainage area, wherein the first drainage area outlets directly to the environment and the second drainage area outlets directly to the environment, wherein the duct is angled vertically in the terminal area of the duct within the air distribution housing.

15. A drainage system for draining water from an air conditioning system into an environment, the drainage system comprising:

a fan causing air to flow through the air conditioning system;

a duct formed in a lower shell of an air distribution housing, the air distribution housing disposed downstream of the fan with respect to the direction of flow of the air through the air conditioning system, the duct including a terminal area;

a first drainage area formed by the terminal area of the duct routing water from an air intake housing, the air intake housing disposed upstream of the fan with respect to the direction of flow of the air through the air conditioning system, the first drainage area draining water to the environment from the air intake housing, wherein the duct extends through an internal space defined by the lower shell of the air distribution housing; and a second drainage area draining water to the environment from the air distribution housing, the first drainage area and the second drainage area formed on the lower shell of the air distribution housing, wherein the duct fluidly separates the water passing through the duct upstream of the first drainage area from the water passing through the internal space of the lower shell upstream of the second drainage area, and wherein the first drainage area outlets directly to the environment and the second drainage area outlets directly to the environment, wherein the duct is angled vertically in the terminal area of the duct within the air distribution housing.

16. The drainage system according to claim 15, wherein the duct includes a connecting piece protruding from an outer wall of the lower shell of the air distribution housing.

17. The drainage system according claim 15, wherein a lower end of the terminal area of the duct forms the first drainage area.

* * * * *